(12) United States Patent
Hsieh et al.

(10) Patent No.: US 7,715,303 B2
(45) Date of Patent: May 11, 2010

(54) RECORDING APPARATUS FOR OPTICAL DATA

(75) Inventors: Hsiang-Ji Hsieh, Yungho (TW);
Hsueh-Kun Liao, Chu Pei (TW);
Yu-Kai Chou, Kao Hsiung (TW);
Yu-Hsin Lin, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 715 days.

(21) Appl. No.: 11/235,369

(22) Filed: Sep. 27, 2005

(65) Prior Publication Data

US 2007/0070840 A1    Mar. 29, 2007

(51) Int. Cl.
G11B 7/00    (2006.01)
(52) U.S. Cl. ................................. 369/124.05
(58) Field of Classification Search .............. 369/44.34, 369/44.29, 44.23, 44.35, 124.05, 124.11
See application file for complete search history.

(56) References Cited

U.S. PATENT DOCUMENTS

| | | | |
|---|---|---|---|
| 4,751,695 A | 6/1988 | Kaku et al. | |
| 5,105,409 A | 4/1992 | Kaku et al. | |
| 5,247,398 A * | 9/1993 | Sidman | 360/75 |
| 5,495,466 A | 2/1996 | Dohmeier et al. | |
| 6,192,009 B1 * | 2/2001 | Kim | 369/44.25 |
| 6,222,815 B1 | 4/2001 | Nagano | |
| 6,314,065 B1 * | 11/2001 | Akkermans | 369/44.25 |
| 6,560,172 B1 | 5/2003 | Nakajo | |
| 6,643,239 B2 * | 11/2003 | Nakajo | 369/53.26 |
| 2002/0100861 A1 * | 8/2002 | Ogawa et al. | 250/205 |
| 2002/0154583 A1 | 10/2002 | Mashimo | |

* cited by examiner

*Primary Examiner*—Peter Vincent Agustín
*Assistant Examiner*—Aneeta Yodichkas
(74) *Attorney, Agent, or Firm*—Birch, Stewart, Kolasch & Birch, LLP

(57) ABSTRACT

A recording apparatus for optical data includes a photo detection IC for producing a plurality of phase signals; a plurality of sample/hold (S/H) circuits electrically connected to the photo detection IC; a plurality of limiter circuits electrically connected to the photo detection IC; a channel signal generator connected to the S/H circuits; and a level shift circuit connected to an output of the channel signal generator. The recording apparatus for optical data prevents the interference of servo signal during high speed operation and ensures normal operation of S/H circuits thereof.

18 Claims, 9 Drawing Sheets

RECORDING APPARATUS FOR OPTICAL DATA

BACKGROUND OF THE INVENTION

1. Field of the Invention

The present invention relates to a recording apparatus for optical data, more particularly to a recording apparatus for optical data, which uses limiter circuit to attenuate a reference voltage to minimize the influence of writing power to servo signal.

2. Description of Prior Art

The optical pick-up head in recording apparatus needs several servo control mechanism during the reading or recording optical data. For example, the laser of the pick-up head requires focusing control to control the focus point in vertical direction of optical disk and tracking control to control the focus point in radial direction of optical disk. Therefore, the laser can be precisely focused along the spiral track of the optical disk by feedback control of the servo controller.

FIG. 1 shows a schematic diagram of recording apparatus for optical disk.

To provide servo signal for error detection and servo control, a semi-cylinder lens 14 is placed in front of a photo detection IC 16 along the optical path. The semi-cylinder lens 14 provides different depth of focus along a vertical direction and a horizontal direction. In case that the recording apparatus for optical disk uses quad detector to detect optical signal, the quad detector will sense signal of different spiral shapes when the laser is moved in depth or radial direction.

When the laser has correct focusing in vertical direction, the laser will form a circle spot on the photo detection IC 16. When the laser has incorrect focusing in vertical direction, the laser will form spiral spot of different slopes on the photo detection IC 16. The spiral spot of different slopes can be used to create focus error (FE) signal. FIG. 2 shows a schematic diagram of FE signal generator. An FE signal is obtained by the arithmetic operation (A+C)−(B+D) and is output at an output end Vo.

Moreover, the optical disk generally has pre-grooves thereon. The laser beams reflected from the pre-grooves have asymmetric shape when the laser is not focused on center of track. The servo controller can produce track error (TE) signal according to the asymmetric signal reflected from the pre-grooves.

FIG. 3 shows a prior art push-pull circuit for processing the optical signals, wherein the push-pull signal (A+C)−(B+D) is output at Vo. The wobble signal of the optical disk can also be resolved from the push-pull signal. To enhance the resolution of the optical signals, as shown in FIG. 1, an optical grating 12 is provided to divide the optical beams into multiple ones such as three optical beams. The multiple optical beams will be processed to obtain FE, TE, and RF_SUM signal. The photo detection IC 16 is exemplified with four detectors (quad detectors), it should be noted detectors of 8, 12 or other numbers could be used for the photo detection IC 16.

The recording layer of write-once disk and re-write disk is generally a dye layer. FIG. 4 shows a prior art recording circuit for optical disk. FIG. 5A shows a writing signal produced by the recording circuit shown in FIG. 4; FIG. 5B shows a reflection coefficient resulted from the writing signal; and FIG. 5C shows a detection result of the photo detection IC 16 with respect to the writing signal shown in FIG. 5A.

As shown in FIG. 4 and FIG. 5A, an encoder 22 is used produce the writing pulses and an ALPC (auto laser power control) 24 controls the laser power according to the writing pulses. The laser impinges on an optical disk 18 to write data thereon. As shown in FIG. 5A, a mask signal 30 with a higher writing power is used to write a logical one (1) data and a space signal 32 with a lower reading power is used to write a logical zero (0) data. The encoder 22 produces a series of mask signal 30 and space signal 32 according to the data to be recorded and the ALPC 24 controls laser power according to the series of mask signal 30 and space signal 32.

As shown in FIG. 5B, the reflection coefficient of the disk is reduced by the higher writing power. The laser power does not instantaneously reach high level and the reflection coefficient of the disk has gradual change as shown in FIG. 5B. Therefore, the detection result of the photo detection IC 16 has waveform shown in FIG. 5C.

FIG. 6 shows a prior art photo detection IC 16 with sample/hold (S/H) circuit 20. The S/H circuit 20 is incorporated to each channel of the photo detection IC 16 to prevent jitter in output signal of the photo detection IC 16. The S/H circuit 20 generally works quite well in low speed recording operation of the recording apparatus for optical data.

The operation voltage of analog front end (the circuit portion connected to the photo detection IC 16) is now reduced to about 3.3V due to the progress in semiconductor manufacture. However, the operation voltage of the photo detection IC 16 is still maintained at 5V. In high speed recording operation of the recording apparatus for optical data, the prior art recording apparatus for optical data may have problem because the photo detection IC 16 output a higher voltage (such as 4V) than the operation voltage of analog front end. FIGS. 7A and 7B show switch circuit connected before the S/H circuit 20. The NOT gate 36 shown in FIG. 7A is implemented by PMOS M3 and NMOS M4 shown in FIG. 7B. It should be noted the output V1 is always smaller than the AFE (analog front end) voltage VCC.

When the control voltage V1 is at high state, the PMOS M1 is at low voltage and the NMOS M2 is at high voltage. When the control voltage V1 is at low state, the PMOS M1 is at high voltage and the NMOS M2 is at low voltage. The control voltage V1 is smaller than the AFE voltage VCC because those MOS transistors are powered by AFE voltage VCC. If VCC is 3.3V, then the control voltage V1 must be smaller than 3.3V. The PMOS transistor is turned on when gate-source voltage Vgs is larger than a threshold voltage Vth. The PMOS transistor is turned off when gate-source voltage Vgs is smaller than the threshold voltage Vth. The control voltage V1 must be smaller than the AFE voltage VCC and the output voltage of the photo detection IC is larger than the AFE voltage VCC. Therefore, the PMOS transistor is always turned on and has leakage problem. The pike 34 shown in FIG. 5C will cause error of S/H circuit in space signal region, especially in high speed operation.

SUMMARY OF THE INVENTION

It is the object of the present invention to provide a recording apparatus for optical data, which uses limiter circuit to attenuate a reference voltage to minimize the influence of writing power to servo signal.

In one aspect of the present invention, the output signal level is limited by NMOS transistor or a diode.

In another aspect of the present invention, a level shift circuit is provided after an RF_SUM adder to prevent DC offset problem due to a voltage divider.

DETAILED DESCRIPTION OF THE PREFERRED EMBODIMENTS

Figure 1:
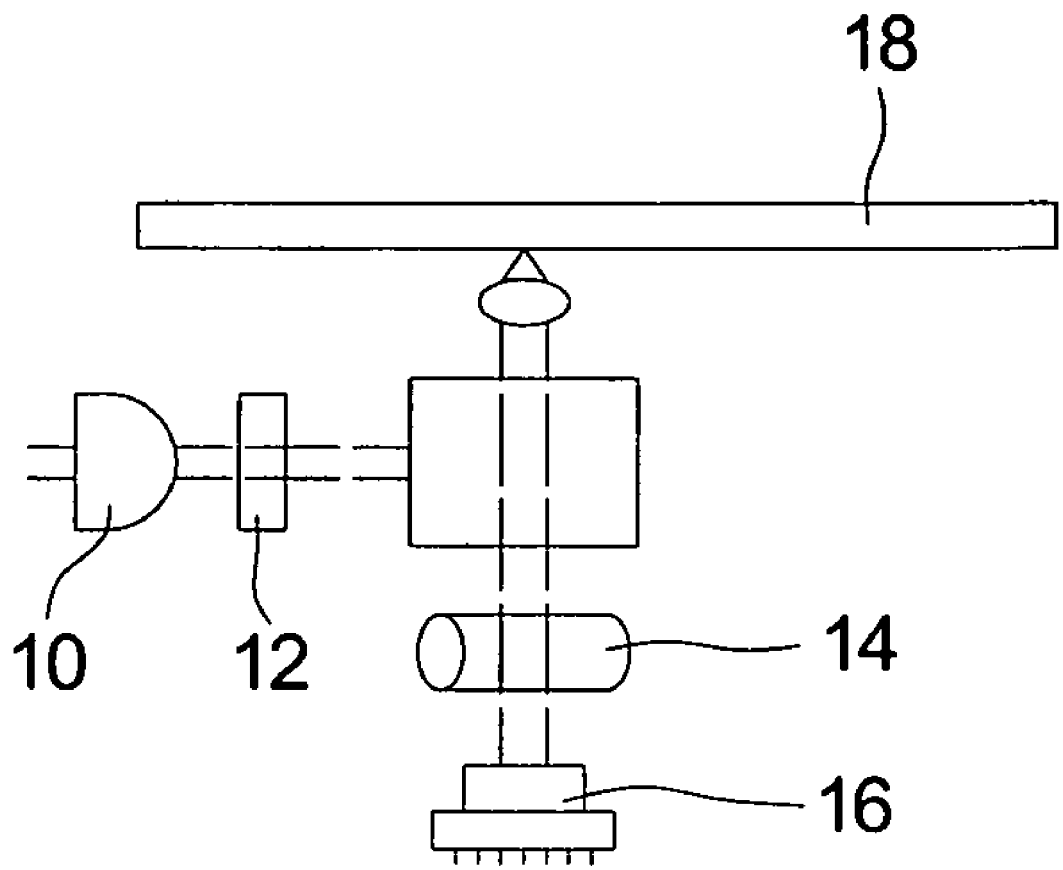
FIG. 1 shows a schematic diagram of recording apparatus for optical disk.
Figure 2:
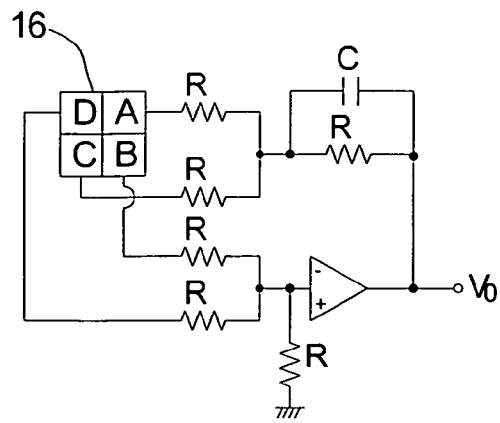
FIG. 2 shows a schematic diagram of FE signal generator.
Figure 3:
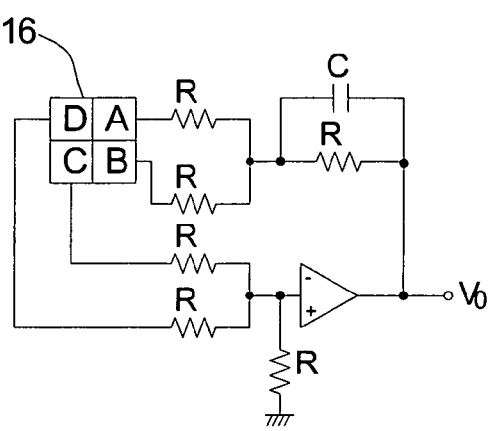
FIG. 3 shows a prior art push-pull circuit for processing the optical signals.
Figure 4:
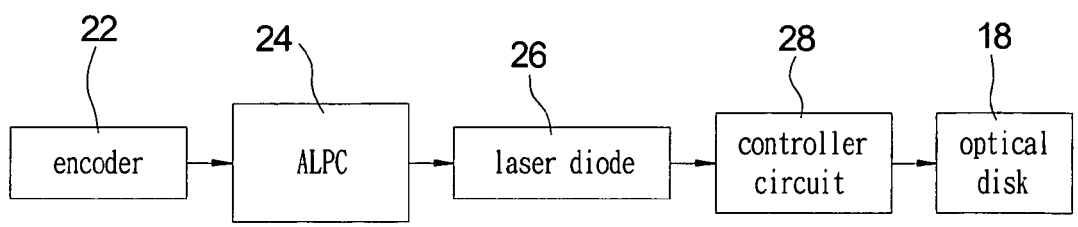
FIG. 4 shows a prior art recording circuit for optical disk.
Figure 5A:
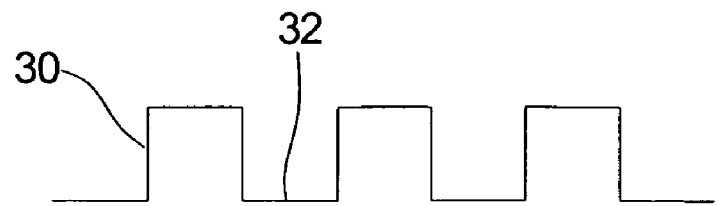
FIG. 5A shows a writing signal produced by the recording circuit shown in FIG. 4.
Figure 5B:
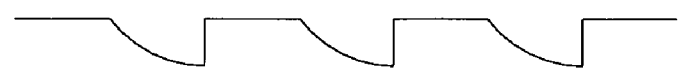
FIG. 5B shows a reflection coefficient resulted from the writing signal.
Figure 5C:
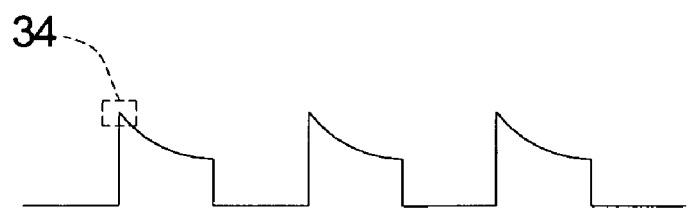
FIG. 5C shows a detection result of the photo detection IC with respect to the writing signal shown in FIG. 5A.
Figure 6:
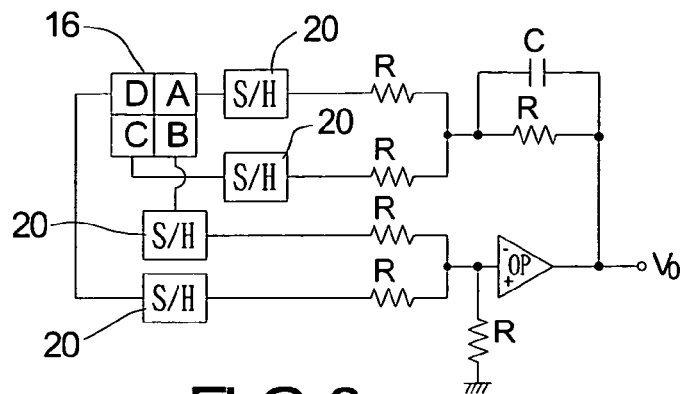
FIG. 6 shows a prior art photo detection IC with sample/hold (S/H) circuit.
Figure 7A:
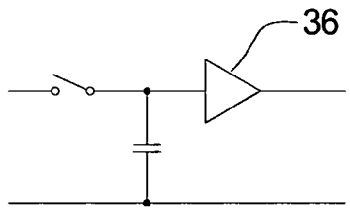
FIGS. 7A and 7B show switch circuit connected before the S/H circuit.
Figure 7B:
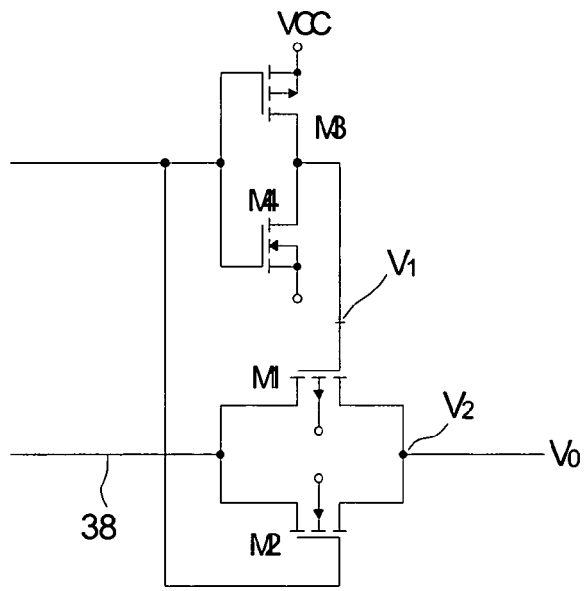
Figure 8A:
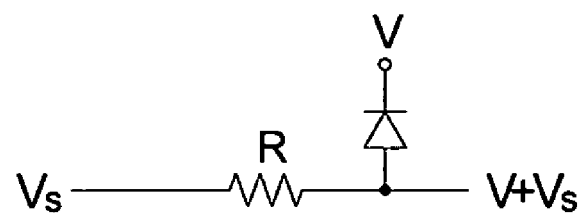
FIG. 8A shows the circuit diagram of limiter circuit according to the present invention.
Figure 8B:
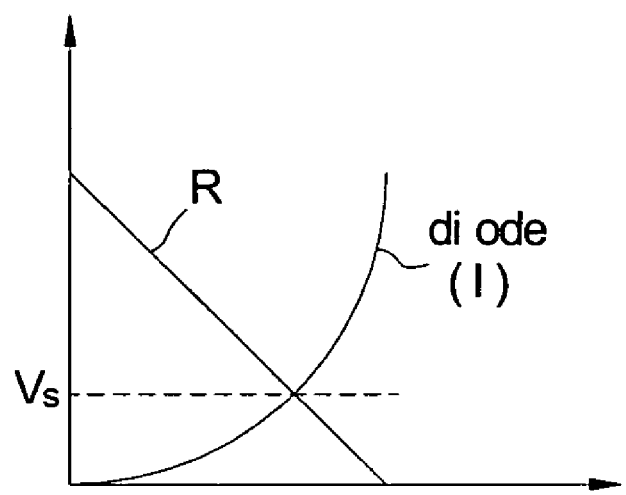
FIG. 8B shows an operation curve of the limiter circuit according to the present invention.

FIG. 8A shows the circuit diagram of limiter circuit according to the present invention, which is a voltage divider composed of a plurality of resistors. The voltage divider can also be implemented by a resistor in series with a diode, or by an NMOS transistor. FIG. 8A shows the divider being implemented by a resistor in series with a diode. FIG. 8B shows an operation curve of the limiter circuit. The limiter circuit is used to attenuate the reference voltage to a voltage Vs, which can be determined by the intersection of resistor curve and characteristic curve of diode. The reference voltage Vs ensures the normal operation of S/H circuit.

The limiter circuit can be applied to a specific voltage to the adder circuit of RF-SUM signal, for example, applied to attenuate the ground voltage. A voltage shift occurs for the adder circuit and a level shift circuit is needed. For subtract circuit, the voltage shift does not occur and a level shifter is not needed.

Figure 9:
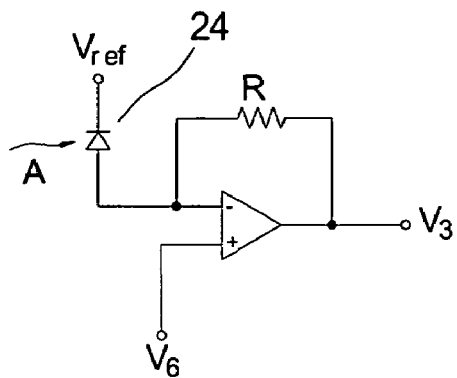
FIG. 9 shows a schematic diagram of internal circuit of the photo detection IC.

More particularly, when a DC offset is present in one channel and in another channel, the DC offsets can be cancelled when the two channels are subjected to subtract operation. The voltage divider will perform attenuation operation according to a specific voltage and a level shift circuit is required when the specific voltage is not a reference voltage. FIG. 9 shows a schematic diagram of internal circuit of the photo detection IC. The output voltage V3 is reference voltage when there is no light and no induced current. When there is an induced current i by light, the output voltage V3 is A+Vref (reference voltage), A=i×R. When there is an induced current −i by light, the output voltage V3 is −A+Vref (reference voltage).

Figure 10:
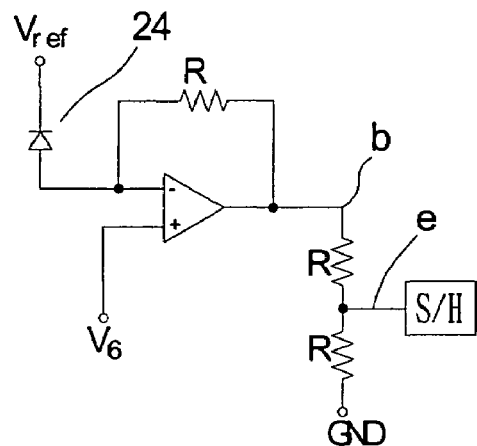
FIG. 10 shows a photo detection IC with an attenuator circuit.

FIG. 10 shows a photo detection IC with an attenuator circuit. The input signal e is not equal to the attenuation voltage A. The input signal e is equal to nA+nVref+(1−n)V1, wherein V1 is reference voltage for the voltage divider and n=R1/(R1+R2). The voltage V1 could be ground voltage or other voltage. Therefore, the attenuation signal becomes nA and the reference voltage becomes nVref+(1−n)V1. Therefore, the input signal e for S/H circuit will be modified to above expression. The voltage divider can be implemented by a plurality of resistors, a resistor in series with a diode, or by an NMOS transistor.

Figure 11:
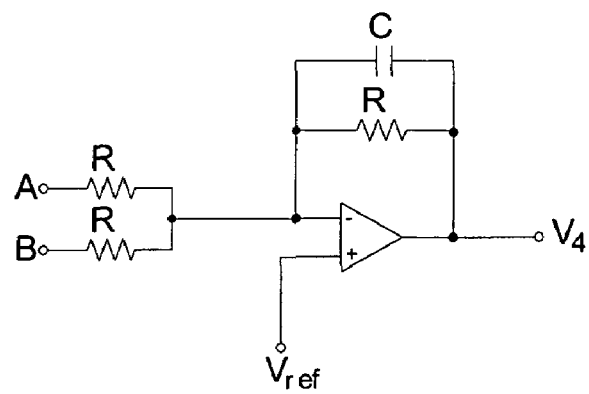
FIG. 11 shows an adder circuit to sum the output signal of the photo detection IC.
Figure 12:
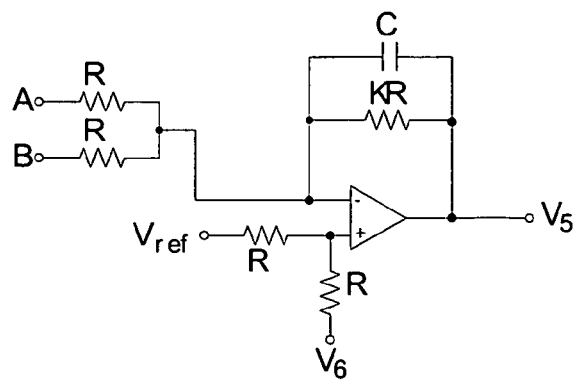
FIG. 12 shows a divider circuit is added before the adder circuit.

FIG. 11 shows an adder circuit to sum the output signal of the photo detection IC. The input Va is the output Vref+A of the first photo detection IC, the input Vb is the output Vref+B of the second photo detection IC. The output V4 is −K1(A+B)+Vref, wherein K1=R4/R3. In FIG. 12, an attenuation circuit and an S/H circuit are added before the adder circuit. The input signal Va' becomes nA+nVref+(1−n) V1, wherein n=R1/(R1+R2)=R5/(R5+R6). The input signal Vb' becomes nB+nVref+(1−n) V1. The output signal V5 becomes −nK2 (A+B)+nVref+(1−n) V1, wherein K2=R8/R7. Even though K2 is adjusted to nK2=K1, the output still has DC offset and a level shift circuit is required.

Figure 13:
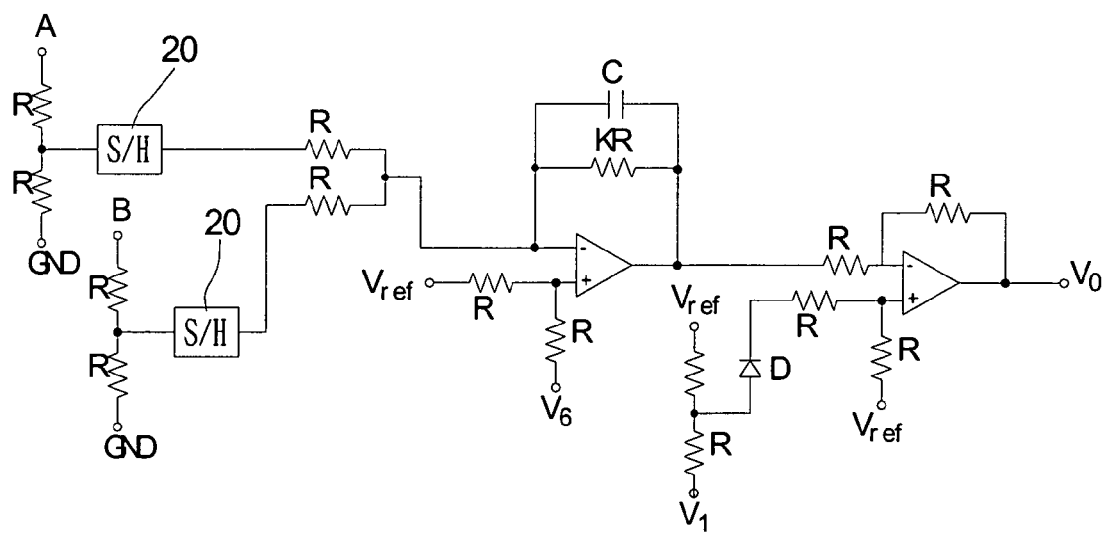
FIG. 13 shows a circuit diagram for RF-SUM adder.
Figure 14:
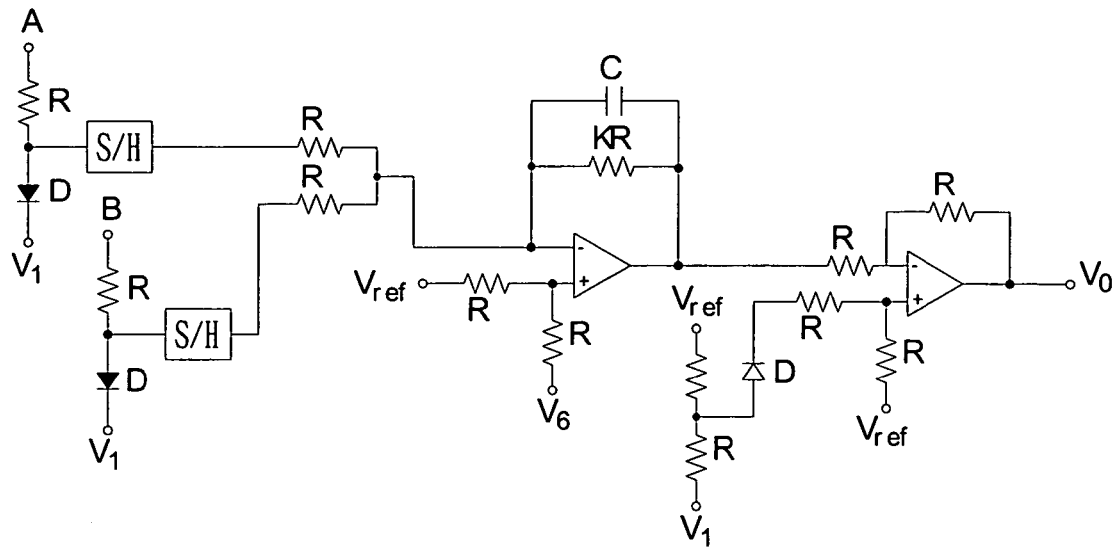
FIG. 14 shows the reference voltage of the voltage divider being Vref.

FIG. 13 shows a circuit diagram for RF-SUM adder, wherein a level shift circuit is added after the adder to compensate the DC offset due to the attenuator. The output signal Vo is nK2 (A+B)+Vref, wherein n=R1(R1+R2)=R5/(R5+R6), K2=R8/R7. As shown in FIG. 14, if the reference voltage of the voltage divider is Vref, the level shift circuit can be neglected and the output of adder Vo=nK2 (A+B)+Vref. However, the attenuation amount should be increased to ensure normal operation.

Figure 15:
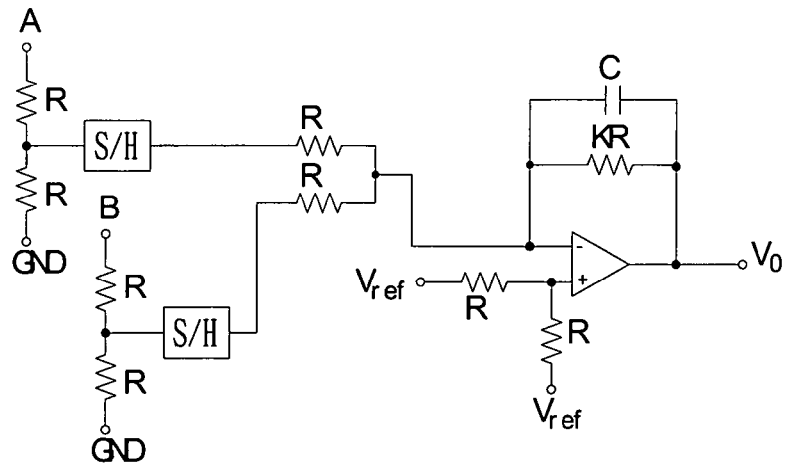
FIG. 15 shows a push-pull adder.

FIG. 15 shows a push-pull adder and the DC offset thereof will be cancelled. Therefore, the output signal is Vo=nK3(B−A)+Vref.

Figure 16:
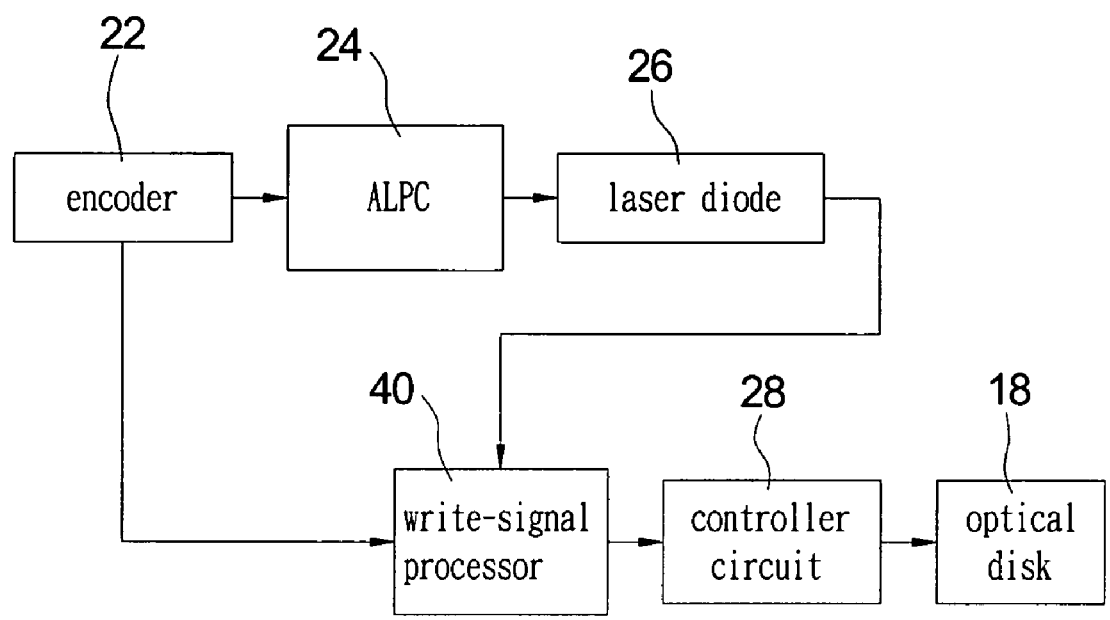
FIG. 16 shows the block diagram of the recording apparatus for optical data according to the present invention.

FIG. 16 shows the block diagram of the recording apparatus for optical data according to the present invention. The recording apparatus according to the present invention comprises an encoder 22 for producing digital signal for data, a laser diode 26, an ALPC 24 connected to the encoder 22, a write-signal processor 40 connected to the encoder 22 and the laser diode 26 to produce write signal. The write-signal processor 40 comprises a photo detection IC for producing a plurality of phase signals, a plurality of limiter circuits connected to the photo detection IC. The limiter circuit is voltage divider composed of a plurality of resistors. The limiter circuit can also be implemented as a resistor in series with a diode, or by an NMOS transistor.

The write-signal processor 40 further comprises a plurality of S/H circuits connected to the photo detection IC, a channel signal generator connected to the photo detection IC and being an RF_SUM adder and a level shift circuit connected to an output of the channel signal generator. A controller circuit 28 is connected to the write-signal processor 40 to control a light beam for writing data to an optical disk 18. The controller circuit 28 comprises an optical grating receiving an optical signal from the laser diode and generating a plurality of signal to the write-signal processor; a photo detection IC; and a semi-cylindrical lens connected to the optical grating and the optical pick-up head. The semi-cylindrical lens produces control signals along a vertical direction and a horizontal direction. The optical disk 18 can be write-once disk or re-write disk.

What is claimed is:

1. A recording apparatus for optical data, comprising:
   a photo detection IC for producing a plurality of phase signals;

a plurality of sample/hold (S/H) circuits electrically connected to the photo detection IC for performing sample and hold operation to the plurality of phase signals; and a plurality of voltage dividers electrically connected to the photo detection IC and the plurality of S/H circuits, outputting a limited signal to the plurality of S/H circuits to ensure normal operation of the S/H circuits, wherein the limited signal is obtained by limiting an output signal of the photo detection IC.

2. The recording apparatus for optical data as in claim 1, wherein the voltage dividers each comprises a plurality of resistors.

3. The recording apparatus for optical data as in claim 1, wherein the voltage dividers each comprises a resistor in series with a diode.

4. The recording apparatus for optical data as in claim 1, wherein the voltage dividers each comprises an NMOS transistor.

5. A recording apparatus for optical data, comprising:

a photo detection IC for producing a plurality of phase signals;

a plurality of sample/hold (S/H) circuits electrically connected to the photo detection IC for performing sample and hold operation to the plurality of phase signals;

a plurality of voltage dividers electrically connected to the photo detection IC and the plurality of S/H circuits, outputting a limited signal to the plurality of S/H circuits to ensure normal operation of the S/H circuits, wherein the limited signal is obtained by limiting an output signal of the photo detection IC;

a channel signal generator connected to the S/H circuits; and a level shift circuit connected to an output of the channel signal generator for providing a DC offset with respect to a reference voltage.

6. The recording apparatus for optical data as in claim 5, wherein the voltage dividers each comprises a plurality of resistors.

7. The recording apparatus for optical data as in claim 5, wherein the voltage dividers each comprises a resistor in series with a diode.

8. The recording apparatus for optical data as in claim 5, wherein the voltage dividers each comprises an NMOS transistor.

9. The recording apparatus for optical data as in claim 5, wherein the channel signal generator is an RF sum circuit.

10. The recording apparatus for optical data as in claim 9, wherein the RF sum circuit is an adder circuit.

11. A recording apparatus for optical data, comprising:

an encoder for producing a plurality of digital signals;

a laser diode; an ALPC (auto laser power control) connected to the encoder to control a laser power;

a write-signal processor connected to the encoder and the laser diode to produce a write signal; and a controller circuit connected to the write-signal processor and controlling an optical pick-up head according to the write signal, wherein the write-signal processor comprises:

a photo detection IC for producing a plurality of phase signals;

a plurality of sample/hold (S/H) circuits electrically connected to the photo detection IC for performing sample and hold operation to the plurality of phase signals;

a plurality of voltage dividers electrically connected to the photo detection IC and the plurality of S/H circuits, outputting a limited signal to the plurality of S/H circuits to ensure normal operation of the S/H circuits, wherein the limited signal is obtained by limiting an output signal of the photo detection IC;

a channel signal generator connected to the S/H circuits to generate channel signal for an optical disk; and a level shift circuit connected to an output of the channel signal generator to compensate a DC offset for a reference voltage.

12. The recording apparatus for optical data as in claim 11, wherein the voltage dividers each comprises a plurality of resistors.

13. The recording apparatus for optical data as in claim 11, wherein the voltage dividers each comprises a resistor in series with a diode.

14. The recording apparatus for optical data as in claim 11, wherein the voltage dividers each comprises an NMOS transistor.

15. The recording apparatus for optical data as in claim 11, wherein the channel signal generator is an RF sum circuit.

16. The recording apparatus for optical data as in claim 15, wherein the RF sum circuit is an adder circuit.

17. The recording apparatus for optical data as in claim 15, wherein the controller circuit further comprises: an optical grating receiving an optical signal from the laser diode and generating a plurality of signal to the write-signal processor; a photo detection IC; and a semi-cylindrical lens connected to the optical grating and the optical pick-up head, the semi-cylindrical lens producing control signals along a vertical direction and a horizontal direction.

18. The recording apparatus for optical data as in claim 15, wherein the optical disk is one of write-once disk and re-write disk.

* * * * *